(12) United States Patent
Belov et al.

(10) Patent No.: US 8,966,578 B1
(45) Date of Patent: Feb. 24, 2015

(54) INTELLIGENT SYSTEM FOR ENABLING AUTOMATED SECONDARY AUTHORIZATION FOR SERVICE REQUESTS IN AN AGILE INFORMATION TECHNOLOGY ENVIRONMENT

(71) Applicant: HyTrust, Inc., Mountain View, CA (US)

(72) Inventors: Boris Belov, Sunnyvalve, CA (US); Hemma Prafullchandra, Mountain View, CA (US); Govindarajan Rangarajan, Sunnyvale, CA (US)

(73) Assignee: Hytrust, Inc., Mountain View, CA (US)

( * ) Notice: Subject to any disclaimer, the term of this patent is extended or adjusted under 35 U.S.C. 154(b) by 0 days.

(21) Appl. No.: 14/454,593

(22) Filed: Aug. 7, 2014

(51) Int. Cl.
G06F 17/00 (2006.01)
H04L 29/06 (2006.01)
H04L 29/08 (2006.01)

(52) U.S. Cl.
CPC ............... H04L 63/10 (2013.01); H04L 67/10 (2013.01)
USPC ............ 726/1; 726/2; 726/4; 726/7; 713/171; 713/185; 709/225

(58) Field of Classification Search
CPC .................................. G06F 21/31; G06F 21/40
USPC .................. 726/1, 23, 4, 26, 7; 713/153, 171; 709/203
See application file for complete search history.

(56) References Cited

U.S. PATENT DOCUMENTS

| | | | | |
|---|---|---|---|---|
| 8,316,237 B1* | 11/2012 | Felsher et al. | ................ | 713/171 |
| 8,468,244 B2* | 6/2013 | Redlich et al. | ................ | 709/225 |
| 8,578,454 B2* | 11/2013 | Grim | ................. | 726/4 |
| 8,719,562 B2* | 5/2014 | Randle et al. | ................ | 713/153 |
| 8,769,289 B1* | 7/2014 | Kronrod | ........................ | 713/171 |
| 8,793,804 B2* | 7/2014 | Bekker et al. | ................... | 726/26 |
| 2007/0234408 A1* | 10/2007 | Burch et al. | ..................... | 726/6 |
| 2010/0100952 A1* | 4/2010 | Sample et al. | .................... | 726/9 |
| 2011/0162067 A1* | 6/2011 | Shuart et al. | .................... | 726/19 |
| 2013/0145435 A1* | 6/2013 | Fu | ................................ | 726/4 |
| 2014/0053236 A1* | 2/2014 | Kidron | ............................. | 726/1 |
| 2014/0115670 A1* | 4/2014 | Barton et al. | ..................... | 726/4 |
| 2014/0157381 A1* | 6/2014 | Disraeli | ........................ | 726/7 |

OTHER PUBLICATIONS

Jorge Gonzalez, Reverse Oauth, Nov. 2009, Elsevier, vol. 28 Issue 8, pp. 846-856.*

* cited by examiner

*Primary Examiner* — Dede Zecher
*Assistant Examiner* — Viral Lakhia
(74) *Attorney, Agent, or Firm* — Ascenda Law Group, PC (57) ABSTRACT

A service request for a managed computer system is received and once a primary authorization for same has been given, a secondary authorization management system (SAMS) determines whether or not the service request requires secondary authorization. This determination is made according to a context of the managed computer system and an authorization profile for the received service request. If needed, the SAMS resolves the secondary authorization request and returns the resolution decision.

12 Claims, 9 Drawing Sheets

INTELLIGENT SYSTEM FOR ENABLING AUTOMATED SECONDARY AUTHORIZATION FOR SERVICE REQUESTS IN AN AGILE INFORMATION TECHNOLOGY ENVIRONMENT

FIELD OF THE INVENTION

The present invention is directed to providing additional authorization for service requests of a managed computer system.

BACKGROUND

Virtualized systems, cloud systems (e.g. private, hybrid, public as defined by NIST), or other systems defined, with resources provisioned and released, and managed by software just-in-time, (collectively, "managed computer systems") need to be properly secured. Suitable measures need to be in place to ensure business continuity by proactively mitigating risks and threats resulting from both malicious attacks and inadvertent errors by users with access rights. For example, a system may be accidentally disrupted by an administrator with full access who makes changes to assets running mission critical workloads. Dynamic, instantaneous authorization is needed for service requests for managed computer systems in certain situations to improve functionality whilst reducing risk of such computer systems.

SUMMARY

Embodiments are described for providing additional authorization for service requests of a managed computer system.

In one such embodiment, a service request for at least one managed computer system is received from an entity (which may be an individual or an automated process or system) having an access right for requesting the service of the managed computer system. Subsequent to the service request receiving a primary authorization, determining whether or not the service request requires secondary authorization, said determination being made according to a context of the managed computer system and an authorization profile for the received service request. The authorization profile for the received service request may be retrieved from at least one knowledge system associated with the managed computer system. Thereafter, selectively sending, based upon the determination, at least one of (a) the service request and (b) a secondary authorization request to a secondary authorization management system for resolution. Finally, the secondary authorization management system resolves the secondary authorization request and returns the resolution of the secondary authorization request. The context may be an external consideration (e.g., a consideration of systems or events external to the managed computer system).

In some instances of the foregoing, resolution of the secondary authorization request may depend upon resolution of one or more contingencies. Further, the knowledge system information may be indicative of whether or not those one or more contingencies were met.

In other instances, the above-described procedure may include logging at least one of: a context for the managed computer system, the service request, a secondary authorization result, and a service request result; identifying a pattern and adding the pattern to the at least one knowledge system with the secondary authorization result; and determining whether to provide the secondary authorization result in response to a secondary authorization request for another received service request based upon a comparison with the identified pattern.

In some cases, the knowledge system(s) may include at least one of: an internal knowledge system, an authorization profile knowledge system, an external authorization system, a capacity management system, a licensing server, and a change management system.

A further embodiment of an automated method for seeking and obtaining service request authorizations according to the present invention may include receiving, from a requesting entity and at a service request authorization management system that is communicably coupled to one or more elements of a managed computer system, a service request for a resource of the managed computer system, said service request having be granted a primary authorization indicating at least that the requesting entity is authorized for the service request; determining whether or not secondary authorization is necessary for the received service request; and if no secondary authorization is necessary for the received service request, deeming the received service request authorized, otherwise, if secondary authorization is necessary for the received service request, then determining whether, prior to seeking secondary authorization, any additional tasks require completion. If no additional tasks require completion, requesting secondary authorization for the received service request according to configured policies for and a current context of the managed computer system, otherwise, if additional tasks do require completion, postponing requesting secondary authorization for the received service request pending resolution of the additional tasks requiring completion and periodically determining whether or not the additional tasks have been completed such that if the additional tasks are not completed at least within a time limit, denying the service request, otherwise, if the additional tasks are completed at least within the time limit requesting the secondary authorization for the received service request according to then-configured policies for and a then-current context of the managed computer system. If the requested secondary authorization is received, deeming the received service request authorized, pending resolution of any post-secondary authorization conditions, otherwise, if the requested secondary authorization is not received, denying the service request. If the received service request is deemed authorized, determining whether or not any post-authorization conditions must be satisfied before a service request authorization can be returned in response to the received service request, and, if so, postponing providing the service request authorization pending resolution of the post-authorization conditions requiring completion, otherwise, issuing the secondary authorization for the received service request.

In some instances, determining whether or not the requesting entity is authorized for the service request may include retrieving an authorization profile for the received service request from a database based upon attributes of the service request, the authorization profile being evaluated as part of the determination as to whether or not the requesting entity is authorized for the service request.

Attributes of the service request may include one or more of: a type of operation specified in the service request, resources associated with the service request, the requesting entity, the time of request, and the managed computer system.

The authorization profile may designate at least one knowledge system with at least one context that is a factor for servicing the service request by the managed computer system. Such a context may be one or more of: data on an environment of operation and/or execution of the managed computer system, a situation, and an external consideration for the managed computer system. Determining whether secondary authorization for the service request is necessary may be based on at least one context of the managed computer system. Alternatively, or in addition, determining whether secondary authorization for the service request is necessary may depend on one or more of: attributes of the service request, a resource specified in the service request, the requesting entity, the time of request, and a type of operation specified by the service request. Also, determining whether or not any post-authorization conditions must be satisfied before the service authorization can be returned in response to the service request may include one or more activities requiring human input.

After resolving the service request, it may be necessary to determine whether current conditions for approval of the service request remain appropriate and, if not, to modify approval criteria for future instances of the service request. Pre- and/or post-authorization conditions for received service requests may include conditions on execution of operations specified by the service request, and/or may include one or more of provisioning of equipment or capacities of such equipment, and authorization of other service requests.

DETAILED DESCRIPTION

In an agile information technology environment that is characterized by instantaneous and dynamic changes made by multiple users with service requests, security authorization for such service requests is desired that is similarly instantaneous and dynamic to handle the service requests in an automated manner. In this context, a user may be a person or a script or application running on a computer system (e.g., a management system) that invokes a service request. In some instances, we refer to such users as "requesting entities."

Regardless of the nature of the requesting entity, in certain situations additional authorization may be desired for service requests beyond a primary authorization for access rights of a user to perform a particular request. By way of example, a user (e.g., an administrator) may have access rights (e.g., privileges) for full access to an agile information technology environment, and as such, the user's request may be authorized and pass a primary authorization evaluation. Continuing with the example, a secondary authorization evaluation for the service request may prevent the following: (1) a rogue user in attempts to manipulate the agile information technology environment, (2) a user making changes to resources of a managed computer system with a high risk profile within the agile information technology environment (e.g., running mission critical workloads), and (3) a user that downloads, moves, or migrates a virtual machine disk (e.g., vmdk) to other agile information technology environment and/or other storage media. In another example, additional authorization may be beneficial when a user of a managed computer system who has privileges to manage physical and/or virtual machines (VMs) and attempts to make changes such as powering off a machine (physical or virtual) running a critical workload (e.g., a firewall appliance) and/or assigning a network to the machine.

Additional authorization evaluation (s) may be beneficial for certain service requests to ensure there is enough capacity and/or may require additional validation to ensure compliance with management policies before servicing a request. For example, the capacity(ies) of the managed computer system may require modification before servicing a request for additional resources, such as more CPU, memory, and/or a request for non-standard configuration/resources. In another example, requests may require further validation, such as with use of a cloud/virtualization management platform, when a user attempts to allocate resources dynamically and must comply with utilization service-level agreements (e.g. adding more memory but does not have sufficient capacity allocated to them), and/or management security requirements to provision or configure policies for the newly created virtual systems (e.g., firewall rules). The described use cases warrant the need for dynamic, instantaneous additional authorization for certain types of service requests.

In some embodiments, secondary authorization itself may be automated and in some cases, may not require human intervention. An authorization profile indicating risks and contingencies for particular service requests may be accessed to determine which systems may need to be provisioned, configured and accessed to determine whether a request can be authorized and/or automate authorization of the request.

Figure 1A:
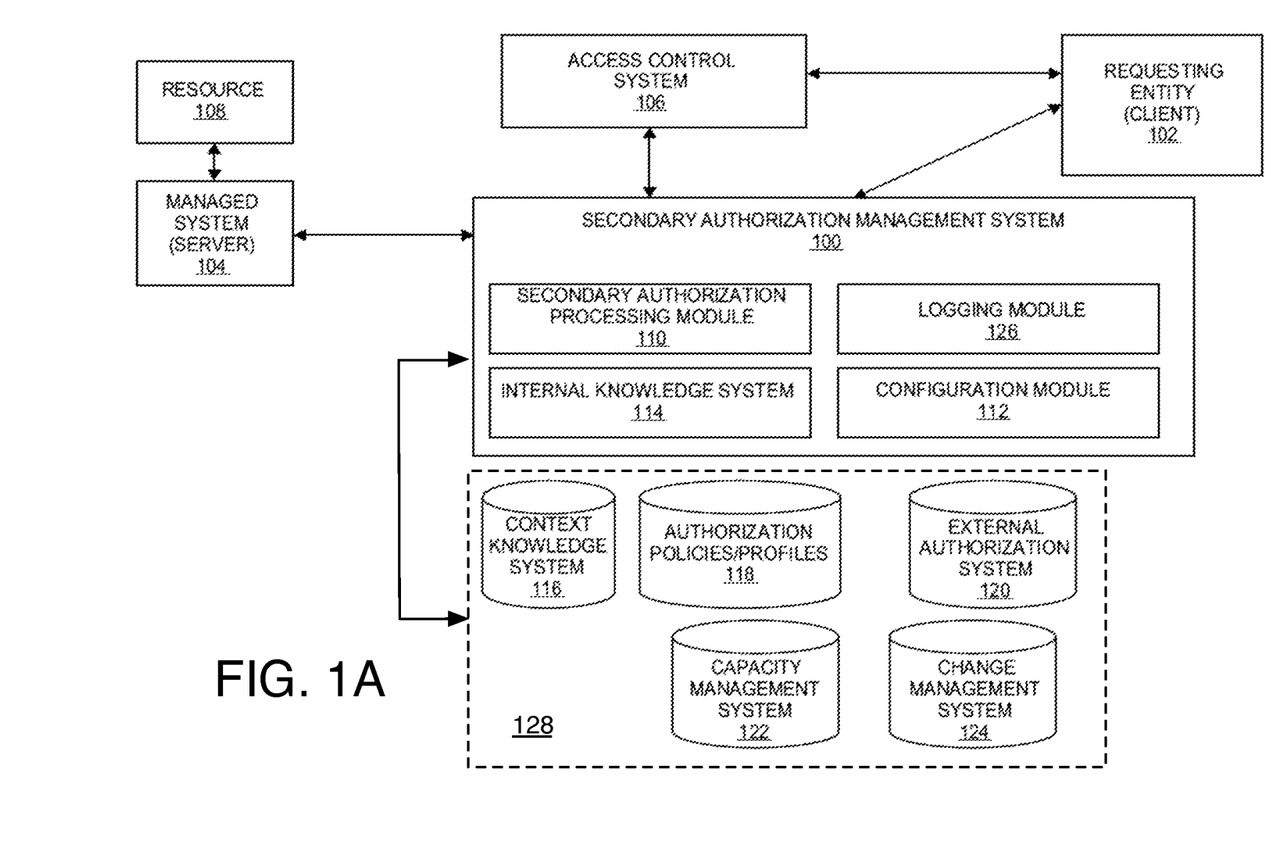
FIG. 1A depicts an example of a secondary authorization management system in accordance with some embodiments of the invention.

FIG. 1 depicts a system configured in accordance with some embodiments of the invention. Secondary authorization management system (SAMS) 100 may determine whether additional authorization is desired for a service request received from a requesting entity 102 for a managed computer system 104. The requesting entity 102 may be an application executing on a device and/or a human user (e.g., a consumer of a cloud system or virtualized system) with access rights to make the service request to the managed computer system 104 (or a particular resource 108 of the managed computer system 104). The resource 108 may be a physical resource and/or a virtual resource (e.g., virtual object) of the managed computer system 104.

The service request may be sent and/or intercepted by an access control system (ACS) 106 (the primary authorization system servicing traditional authorization requests, i.e., those which do not require secondary authorization). The credentials and/or access rights of the requesting entity may be verified by the ACS 106 to satisfy a primary authorization request. The service request may be sent to the SAMS 100 for a determination as to whether additional authorization is necessary for the service request in one or more contexts for the managed computer system 104.

Managed computer system 104 may be a physical and/or virtualized system (e.g., as described in further detail with FIGS. 2 and 3), a cloud computing system (e.g., private, hybrid, and/or public cloud computing systems), a system with supporting a multi-tenant application, any other system with resources that are provisioned, released (e.g., deprovisioned), and remotely managed by software as needed (e.g., just-in-time), containerized system, software-defined system, and/or any combination thereof. It may be beneficial to view the managed computer system as an agile information technology environment that changes rapidly and dynamically to handle (self-) service requests by multiple users. Examples of a virtualized ecosystem that may be managed computer systems in some embodiments are described in U.S. patent application Ser. No. 13/717, 511, entitled "Intelligent Security Control System for Virtualized Ecosystems," and hereby incorporated by reference in its entirety. A virtualized system has a virtual version of a resource, such as computer hardware, operating system, storage device, computer network, applications, and/or any combination thereof. A multi-tenant application is an instance of software that runs on a computer system and handles service requests by multiple client-organizations. With a multi-tenant architecture model, the multi-tenant application may be designed to logically partition data and customize a configuration of the application, such that each client organization experiences a customized virtual application, and demonstrate adequate separation of their systems and access.

Cloud computing is a model for enabling ubiquitous, convenient, on-demand network access to a shared pool of configurable computing resources (e.g., networks, network bandwidth, servers, storage, application, and services) that can be rapidly provisioned and released with minimal management effort or service provider interaction. National Institute of Standards and Technology (NIST) defines cloud computing in the "The NIST Definition of Cloud Computing," Special Publication 800-145, September 2011, by Peter Mell and Timothy Grace, and is hereby incorporated by reference in its entirety. Characteristics of the cloud computing system may include, but is not limited to, any of the following: on-demand self-service, broad network access, resource pooling, rapid elasticity, and measured service. On-demand self service allows for provisioning of computing capabilities, such as server time and network storage, as needed without requiring human interaction with the service provider. Broad network access refers to capabilities available over the network and access through mechanisms that promote use by heterogeneous thin or thick client applications (e.g., on mobile phones, tablets, laptops, and/or workstations). The cloud computing system provider may pool computing resources to serve multiple consumers (e.g., users from organizations) using the multi-tenant model, with different physical and virtual resources dynamically assigned and reassigned according to consumer demand. Capabilities may be elastically provisioned and released, in some cases automatically, to scale rapidly outward and inward commensurate with demand. Cloud systems may automatically control and optimize resource use by leveraging a metering capability (e.g., pay-per-use or charge-per-use basis). Resource usage can be monitored, controlled, and reported, providing transparency for the provider as well as the consumer of the service.

Cloud computing systems service models, may include, but are not limited to, the following: software as a service (SaaS), platform as a service (PaaS), and infrastructure as a service (IaaS). SaaS provides the consumer with the capability to use the service provider's applications running on a cloud infrastructure. The cloud infrastructure may be a collection of hardware and software, and can be viewed as containing both a physical layer and an abstraction layer. The physical layer may consist of hardware resources to support the cloud services. The abstraction layer is deployed across the physical layer and may have one or more of the cloud computing characteristics. The applications of SaaS may be accessible from various client devices, such as a thin client (e.g., a web browser) or a program interface. In some embodiments of SaaS, the consumer does not manage or control the underlying cloud infrastructure with the optional exception of application configuration settings. PaaS provides the consumer with the capability to deploy onto the cloud infrastructure consumer-related or acquired applications created using programming languages, libraries, services, and/or other tools provided by the provider. In some embodiments of PaaS, the consumer does not manage or control the underlying cloud infrastructure, but the consumer may have control over the deployed applications and optionally configuration settings. IaaS provides the consumer with the capability to provision processing, storage, networks, and other fundamental computing resources. The consumer is able to deploy and run arbitrary software, such as operating systems and applications. In some embodiments of IaaS, the consumer may not manage or control the underlying cloud infrastructure and may have control over operating system, storage, and deployed applications; and optionally control over networking components (e.g., firewalls). The cloud computing systems may be private clouds, community clouds, public clouds, hybrid clouds, and/or any other type of cloud. The private cloud infrastructure is provisioned for a single organization comprising multiple consumers (e.g., business units). The community cloud infrastructure is provisioned for use by a specific community of consumers from organizations that have shared concerns (e.g., mission, security requirements, policy, and/or compliance considerations). The public cloud infrastructure is provisioned for use by the general public. The hybrid cloud infrastructure is a composition of two or more distinct cloud infrastructures (private, community, or public) that remain unique entities but are bound together by standardized or proprietary technology that enables data and application portability (e.g., cloud bursting for load balancing between clouds).

The secondary authorization processing module (SAPM) 110 may work in conjunction with the configuration module 112 to determine additional authorizations desired and/or facilitate additional authorizations for service requests as needed. The configuration module 112 may configure and provide access to knowledge systems for determining whether secondary authorization is necessary. The SAPM 110 may use other systems (e.g., knowledge systems) to resolve contingencies related to authorizing the service request.

One or more knowledge systems (e.g., databases, repositories, etc.) 128 may be used to determine one or more contexts for execution of the managed computer system 104 and/or the resource 108 of the managed computer system 104. Knowledge systems 128 may include, but are not limited to, the following: internal knowledge system 114, context knowledge system 116, authorization policies/profiles system, external authorization system 120, capacity management system 122, change management system 124, and/or any other database with information pertaining to the context of the managed computer system 104 (and/or other external systems, e.g., external asset management systems). Profiles and policies may be defined for the managed computer system 104 that provide one or more knowledge systems to check for contexts (which may include the requested operation) pertinent to the managed computer system 104, the requesting entity 102 (which may be a user, an application or a computer system), and/or any combination thereof. The capacity management system 122 may indicate the capacity for provisioning resources and releasing resources of the managed computer system 104. The change management system 124 may provide information on changes to the managed computer system 124 and may indicate preapproved users or users not approved to make service requests. External authorization system 120 may be a third party system that may provide additional context for execution of the managed computer system 104. In some cases, resource 108 and/or managed computer system 104 may be a requesting entity 102 for a resource.

The logging module 126 may be used to log the results of each determination by the SAMS 100 as to whether secondary authorization was performed, results from sending the service request to the managed computer system 104, one or more contexts, authorization profiles, and/or any other data on authorizing, contexts, and handling of the service request. The internal knowledge system 114 may have data gathered using machine learning regarding patterns of contexts that may affect servicing requests by the managed computer system 104 and may rely on data logged with the logging module 126.

Figure 2:
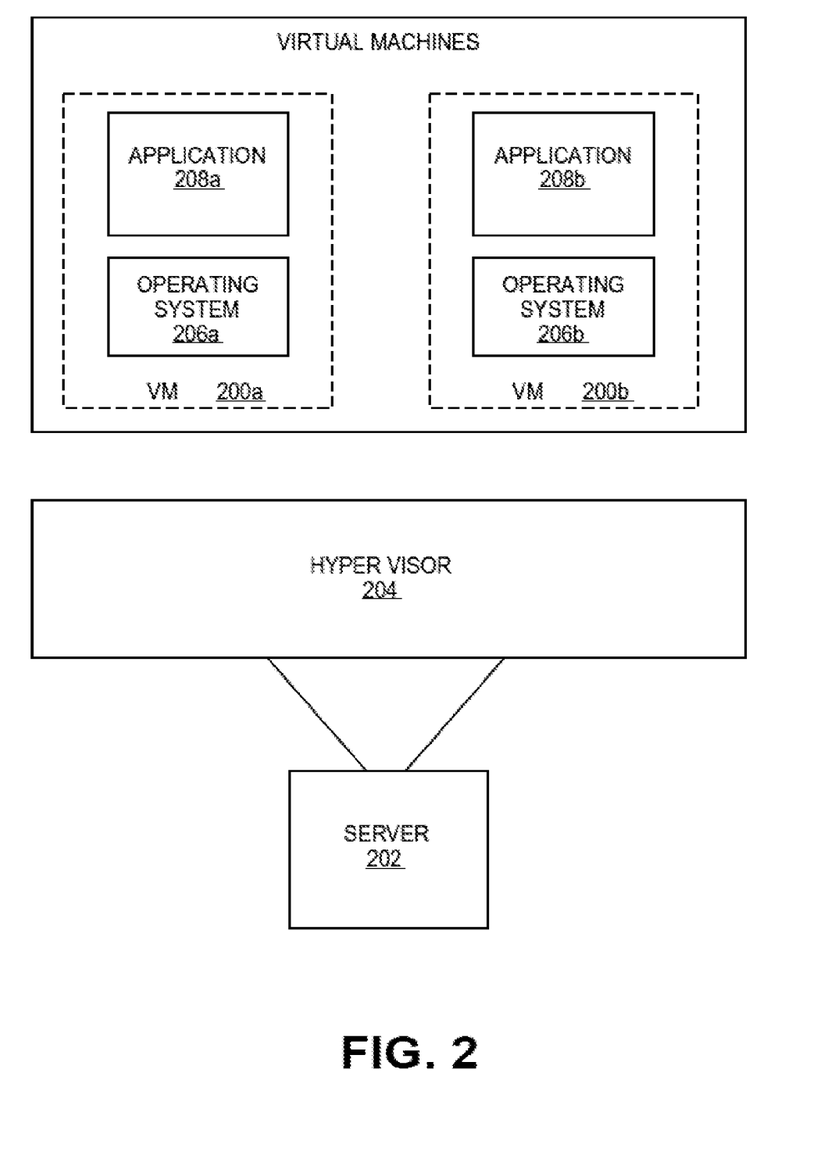
FIG. 2 depicts an example of a managed computer system in accordance with some embodiments of the invention.

FIG. 2 depicts an exemplary system configured in accordance with some embodiments of the invention. FIG. 2 is an example of two virtual machines (VM) 200a and 200b executing on a single physical server 202. The server hardware is abstracted by a hypervisor 204, such as a VMWare™ ESXi Server™. The hypervisor is software that creates and runs a virtual machine. Of course, any other form of hypervisor such as the open source Xen™ or KVM hypervisors could be used and reference to an ESX Server is intended only as an example. Each VM includes its own operating system (OS) 206a and 206b (e.g., Microsoft Windows™, Linux™, Unix™, etc.) and one or more application programs, such as 208a and 208b.

A VM at rest may be represented by a set of files. These files can be stored on local, direct attached storage (e.g., a hard disk), on networked storage such as a storage area network (SAN), or on off-line or near-line storage, such as digital tape. To run/instantiate a VM these files are interpreted by the virtualization layer (i.e. the hypervisor), which then dynamically allocates a fraction of the pool of distributed physical resources available to it to each of the VMs being executed. Running VMs have additional state information stored in run-time memory, cache and registers of various physical devices, and also state-specific files.

A VM can thus be thought of as a virtualization application. The state of the VM can be treated as runtime data of the virtualization application while the configuration of the VM as well as the virtual disk file(s) with OS, application and data, are the data set of the same application. For example, in the VMware vSphere Suite, a virtual machine at rest (powered off) is represented minimally by two files: <vm name>.vmx and <vm name>.vmdk. The VMs are examples of a broader category of constructs called virtual objects (VOs) that define a virtual resource.

Figure 3:
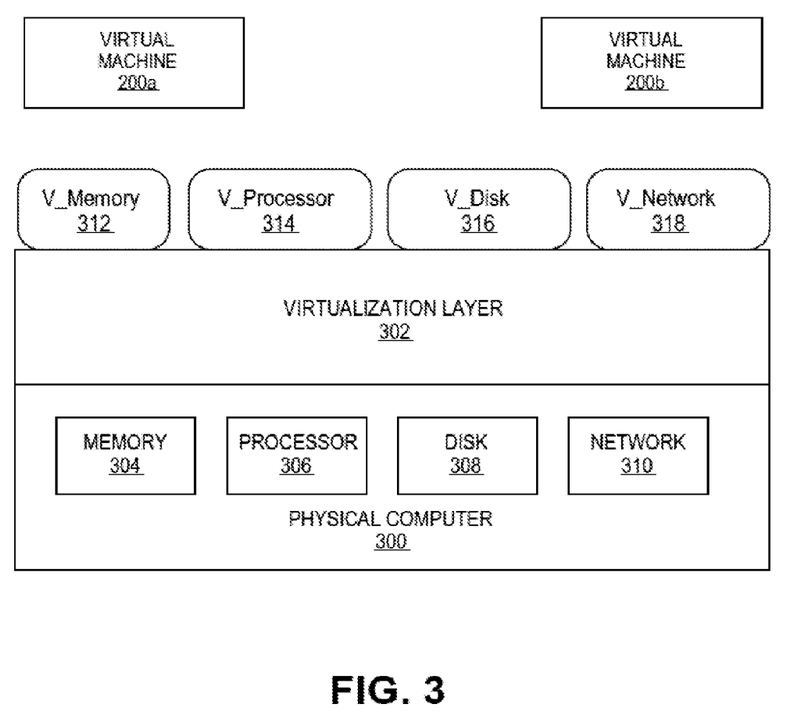
FIG. 3 depicts further example of a managed computer system in accordance with some embodiments of the invention.

FIG. 3 depicts an exemplary system configured in accordance with some embodiments of the invention. FIG. 3 illustrates an example of a single physical computer system 300 with a virtualization layer 302, and subsequent virtualized objects of the physical elements, such as memory 304, processor 306, disk 308, network 310 and machine 300. The diagram is representative only and is not intended to be an exhaustive representation of all the physical elements and their virtual counterparts (if any). In this illustration, the VOs are indicated as V_Memory 312, V_Processor 314, V_Disk 316, V_Network 318 and collectively as a logical unit, VM 200a and/or 200b (collectively 200). Other examples of VOs or logical collections of VOs include a virtual switch, a load-balanced cluster, a named data center, a physical or virtual resource pool, and so on. Groups of physical computer systems on one or more physical networks 310 represent a virtualized ecosystem. VMs on one physical server running a virtualization layer can move to another via a user input through a management interface or through management automation technologies such as VMware's Distributed Resource Scheduler (DRS) and VMotion™. In some embodiments, if the same virtualization technology is used then a virtual network can be formed across the virtualization layer such that the virtual network has a more complex mapping to the underlying physical networks and is much harder to control and manage. For example, a virtualized environment may span two physical sites and a virtual machine running on a virtualized physical server in one site can just as easily run on a virtualized physical server in the other site.

Figure 4A:
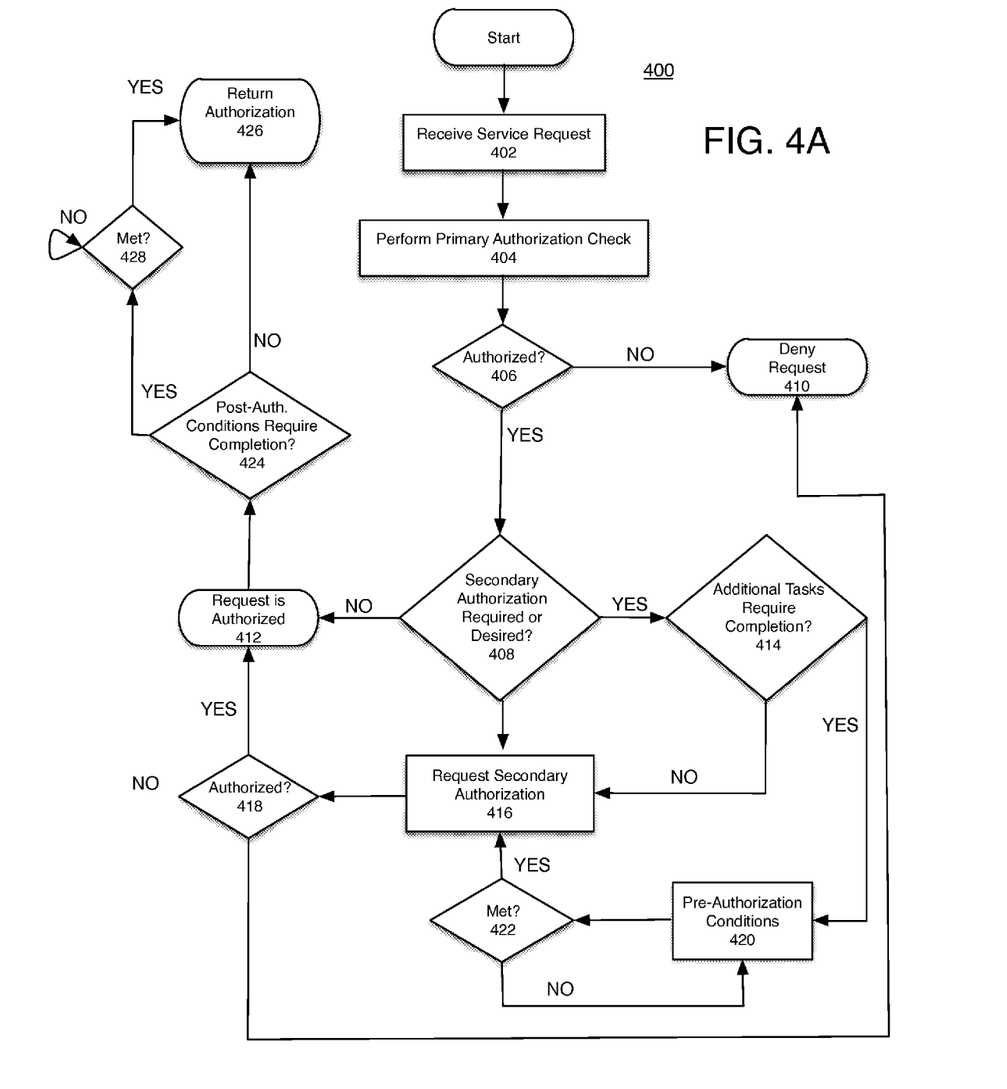
FIG. 4A is a flowchart illustrating one example of a process for obtaining secondary authorizations in accordance with some embodiments of the invention.

FIG. 4A is a flowchart illustrating a process 400 for obtaining service request authorization in accordance with some embodiments of the invention. At 402, a service request for a resource of a managed computer system is received. The service request may be received from a requesting entity with access rights that permit the service request or from a requesting entity that dos not possess such rights. Accordingly, a primary authorization check is performed (e.g., by the ACS 106) (404) to identify the requesting entity, verify the credentials of the requesting entity, check access rights of the requesting entity, and ensure that the requesting entity has authorization to send the type of received service request to the resource. If the entity is not authorized for the service request, the request is denied (and/or an error message is returned) (410). However, if the entity is authorized to make the service request (406), then a determination may be made as to whether secondary authorization is desired and/or required for the service request (408). If no secondary authorization is required or desired for the service request, the request is deemed authorized (412), pending resolution of any post-authorization conditions or requirements that need to be satisfied.

Determining whether or not the entity is authorized to make the service request (406) may require retrieval of an authorization profile for the received service request. The authorization profile may be retrieved from the authorization policies/profiles database 118 based upon on any attributes of the service request, including, but not limited to, the following: the time of the service request, the type of operation in the service request, the resources associated with the service request, the requesting entity, the managed computer system, and/or any combination thereof. The authorization profile may designate at least one knowledge system with at least one context that may be a factor for servicing a request by the managed computer system. The context may be data on an environment of operation and/or execution of the managed computer system, a situation, and/or any other external consideration for the managed computer system.

A determination as to whether secondary authorization for the service request is required or desired (408) may be based on the at least one context for the managed computer system. The availability of the context may warrant sending a request for secondary authorization. Rules may be established on when to perform secondary authorization based upon the context in the authorization profile and/or the SAMS 100. A rule concerning whether or not to perform a secondary authorization with the knowledge system may be explicitly indicated in the authorization profile and/or implied by indicating the accessibility of the knowledge system. For example, rules may be established to perform secondary authorization requests based on the existence of the knowledge system with the context, the combination of the availability of the context and the particular service request attributes, and/or a particular value for the context. In some embodiments, the authorization profile may have a rule that a secondary authorization to interrogate a particular knowledge system for a particular context value over a defined period of time for all service requests or particular service requests of the managed computer system. In another example, rules may be established that any service request that involve provisioning resources may warrant a check on the context at the capacity management system for the managed computer system prior to making the service request.

Any attributes of the service request itself and other contexts may additionally factor into whether to perform secondary authorization for the service request, such as the time of day, the resource in the service request, the requesting entity, and the type of operation of the service request. By way of example, when a service provider administrator of a cloud system is the requesting entity for a service request for a system used by the federal government, the combination of the requesting entity (i.e., service provider administrator) and the existence of a third party external authorization system 120 from the federal government may warrant the secondary authorization request.

Based upon the determination at step 408, the service request may be deemed authorized (410) or not. If not, and secondary authorization is required or desired, A determination is made as to whether, prior to seeking such secondary authorization, any additional tasks (pre-authorization conditions) require completion (414). Pre-authorization conditions may include an occurrence of a trigger event, elapsing of a specified time; tasks related to the managed computer system (e.g., configuring a firewall rule), tasks related to human operators or users of the managed environment (e.g., awaiting an indication that an operator/user has received certification training or has passed an examination), receipt of information which cannot be automatically obtained by the service request authorization management system (e.g., a vulnerability scan or a report indicating service provider compliance), etc. If no such tasks await completion, secondary authorization is requested (416). For example, SAMS 100 may selectively send the service request and/or the secondary authorization request to the managed computer system. If secondary authorization is desired, then a secondary authorization request is sent and the SAMS 100 attempts to authorize the service request before sending the service request to the managed computer system. If secondary authorization is not desired, then the service request may be sent to the managed computer system.

If the requested secondary authorization is received (418), the request is deemed authorized, (412), pending resolution of any post-authorization conditions or requirements that need to be satisfied. Otherwise, if the requested secondary authorization is not received, the request is deemed denied (410) and an error message may be returned.

If, prior to making the secondary authorization request, there are one or more pre-authorization conditions that need to be satisfied (420), then the secondary authorization request remains pending until those one or more conditions have been met (422) (e.g., pending resolution of additional service requests being fulfilled). Once they are met, the secondary authorization request is made (416).

Whether it involves a secondary authorization request or not, once a request is deemed authorized (412), a check is made to determine whether or not any post-authorization conditions must be satisfied before the authorization can be returned in response to the original service request (424). In some instances, this may involve activities that require human input, such as physically allocating or otherwise readying equipment. If no such post authorization conditions exist, then the authorization is returned (426), otherwise, the authorization remains pending until the post-authorization conditions are satisfied (428). Although not shown, at various points within the authorization process 400, one or more notifications may be provided to various individuals and/or systems. For example, notifications regarding the pending status of an authorization awaiting fulfillment of a pre-secondary authorization condition or a post-authorization condition may be transmitted to alert one or more individuals or systems to the need to take action(s) to resolve these conditions. Likewise a notification may be sent to indicate that a request has been authorized and returned or denied. In the case of both pre- and post-authorization conditions, when awaiting satisfaction of those conditions external systems may be continually (or periodically) queried to determine whether or not the condition(s) have been satisfied. In some embodiments, a notice regarding a pending authorization request may be returned to the requesting entity to determine whether to resend the request and/or resolve contingencies. Although not illustrated in the diagram, if resolution of pre or post-authorization contingencies is not possible, perhaps in a timely manner, then the secondary authorization result is deemed denied (410). This may result in an error message being returned in response to the original service request.

In addition, although not shown in the diagram, when service requests are denied a check may be made to determine whether the conditions for approval of the service request remain appropriate. In some instances, it may be required to modify approval criteria. This is also true for approved requests. Hence, the process may include periodically reviewing grants and/or denials of service requests to determine whether or not approval criteria remain appropriate and, if not, to update those approval criteria.

The Pre- and/or post-authorization conditions referred to above are not merely authorizations for the requested operation. Instead, these are conditions on the execution of the requested operation. For example, the pre- and/or post-authorization conditions may include the provisioning of equipment or capacities of such equipment, the authorization of other service requests, etc. Consider, for example, a situation involving a request to migrate a VM. The VM may utilize data and application, and so there may be a need to ensure the data/application is/are encrypted before the VM is migrated (e.g., to reduce the chance of inadvertently exposing the data/application). More generally, the situation requires control over the data prior to migration; hence, a pre-authorization condition to trigger the provisioning of a data security control (so it meets the requirements) before authorization for the migration is provided may be specified. The authorization would remain "pending" until the appropriate data control conditions are met. While in pending state, the secondary authorization management system would automatically seek out and obtain satisfaction of the data security control conditions (e.g., by issuing appropriate notifications and consulting external knowledge system to determine when the data had been encrypted). In general, the preconditions are ones that ensure the environment is in a configuration state that permits the requested service request to be executed (e.g., provision necessary software and/or configure already deployed software to meet requirements), and the post conditions are those that should be completed once the service request is executed (e.g., updates to capacity management or knowledge systems of the authorized completed changes).

Figure 4B:
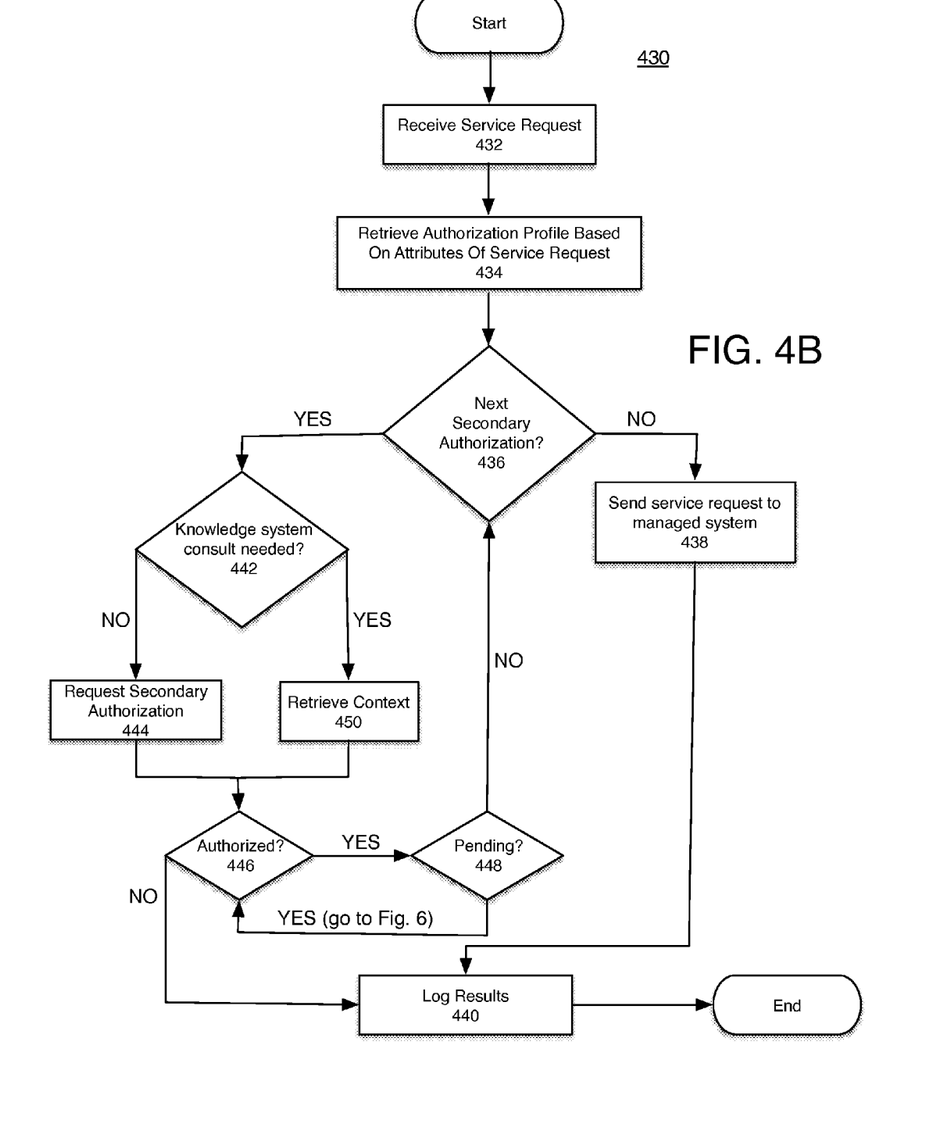
FIG. 4B is a flowchart illustrating a further example of a process for obtaining secondary authorizations in accordance with some embodiments of the invention.

FIG. 4B is a flowchart for a further process 430 involving secondary authorizations in accordance with some embodiments of the invention. A service request for a resource of a managed computer system may be received (432). An authorization profile may be retrieved (434) and the authorization profile may indicate when secondary authorization is desired for the service request (436). By way of example, the configuration module 112 may retrieve one or more authorization profiles for the service request. The authorization profiles may be retrieved based upon on any attributes of the service request, including, but not limited to, the following: time of service request, the type of operation in the service request, the resources associated with the service request, the requesting entity, the managed computer system, a context for the managed computer system, a context for the resource, and/or any combination thereof. The resources associated with the service request may be any resources of the managed computer system that may be affected by and/or tangentially related to the service request. For example, the resources explicitly indicated in the service request as well as resources that are known to be related or affected by changes to the particular resource explicitly indicated in the request may be used to retrieve an authorization profile.

The authorization profiles may be created for the managed computer system and stored with SAMS and/or provided by a third-party with an accessible database. In some embodiments, a context may be retrieved from a knowledge system for the managed computer system and/or resources and the context may also be an attribute used to retrieve the appropriate authorization profile for the service request from the authorization policies/profiles database 118.

The authorization profile may indicate whether secondary authorization is necessary for the service request. The authorization profile may define with rules what sources for secondary authorization are necessary and/or preferred for the service request in order to improve functionality and mitigate risks to the managed computer system. The authorization profile may indicate any number of knowledge systems to consult for particular contexts for authorization, any number of users or groups of users to consult for authorization, any other authorization sources, and/or any other combination thereof. The authorization profile may indicate a priority for each requesting authorization from a source and/or whether authorization from a particular source is preferred and/or necessary. In particular, the authorization profile may indicate whether one or more contexts (e.g., as provided by knowledge systems) that are pertinent or factors for authorizing the service request. In some embodiments, the authorization profile may provide that authorization may be pending (e.g., for a defined period of time) until a particular context is received from a knowledge system.

If secondary authorization is not needed, then the service request is send to the managed computer system (438) and the results are logged (440). The results of the secondary authorization decision, service request, results of the service request, one or more contexts, authorization profiles, and any other data on the service request may be logged.

Alternatively, each secondary authorization request of a secondary authorization source indicated in the authentication profile may be processed (436). The authorization profile may designate and/or the SAPM 110 may decide whether to perform the secondary authorization requests sequentially, in parallel, and/or any combination thereof. Readers should recognize that the sequential stepping through each secondary authorization request needed is provided as an example of implementation for description purposes. In some embodiments, there may be dependencies between the sources designated in the authorization profile for secondary authorization, and the order of the processing of authorization may be performed in accordance with the dependencies. For example, if there is no capacity in the managed computer system for initializing a new VM, then an interrogation of a management system for security policies for the service request may be aborted and/or not performed (e.g., unless requested for logging purposes).

If secondary authorization does not require consulting a knowledge system (442), then a request is made for secondary authorization (444). The request for secondary authorization may be made to other systems, users, groups of users, and/or any combination thereof to provide approval of the service request. In one embodiment, an email request may be sent to one or more users for authorization. If secondary authorization is denied (446), then the results are logged (440) and the process ends. If secondary authorization is authorized (446), then the process continues as described below. Note that although not discussed in detail with this example, the same need to await satisfaction of pre- and/or post-authorization conditions (452) discussed with reference to FIG. 4A may be encountered in connection with the example set forth in FIG. 4B.

If a knowledge system needs to be consulted to satisfy the secondary authorization request (442), then at least one context is retrieved from the knowledge system (450). The context may indicate whether the service request authorization is denied, pending further authorization, and/or denied. For example, the knowledge system may be another authorization system, and the context may be an additional profile with rules for authorization based upon attributes of the request and/or context, and/or the additional profile may indicate further secondary authorization requests to perform. In another example, the knowledge system may be an internal knowledge system with identified patterns of previous contexts and/or service requests that may be permitted, and the service request may match the identified pattern to allow for authorization of the request. The context may indicate with a value (e.g., a Boolean value) whether the service request is possible based upon the capacity of the managed computer system (e.g., from capacity system), security rules set by an enterprise (e.g., third party authorization system), and/or by the terms of a service-level agreement (SLA) with the provider (e.g., a licensing server). If secondary authorization is denied (446), then the results are logged (440) and the process ends.

Alternatively, if secondary authorization is approved (446), the secondary authorization may be pending (448) resolution of further contingencies (e.g., pending resolution of additional service requests being fulfilled, pending human intervention, etc.). Authorization may be reevaluated after a set period of time to ensure further contingencies are met, as described in more detail with FIG. 6. The knowledge systems may be continually queried to provide authorization for the service request. In some embodiments, the pending authorization request may be sent back to the requesting entity to determine whether to resend the request and/or resolve contingencies. If there are no further contingencies (448), then the next secondary authorization request is processed (436) until the process ends.

As above, although not shown in the diagram, when service requests are denied a check may be made to determine whether the conditions for approval of the service request remain appropriate. In some instances, it may be required to modify approval criteria (such as new pre-conditions or contingencies or compensating control needs to be addressed prior to the authorization). This is also true for approved requests. Hence, the process may include periodically reviewing grants and/or denials of service requests to determine whether or not approval criteria remain appropriate and, if not, to update those approval criteria.

Figure 5:
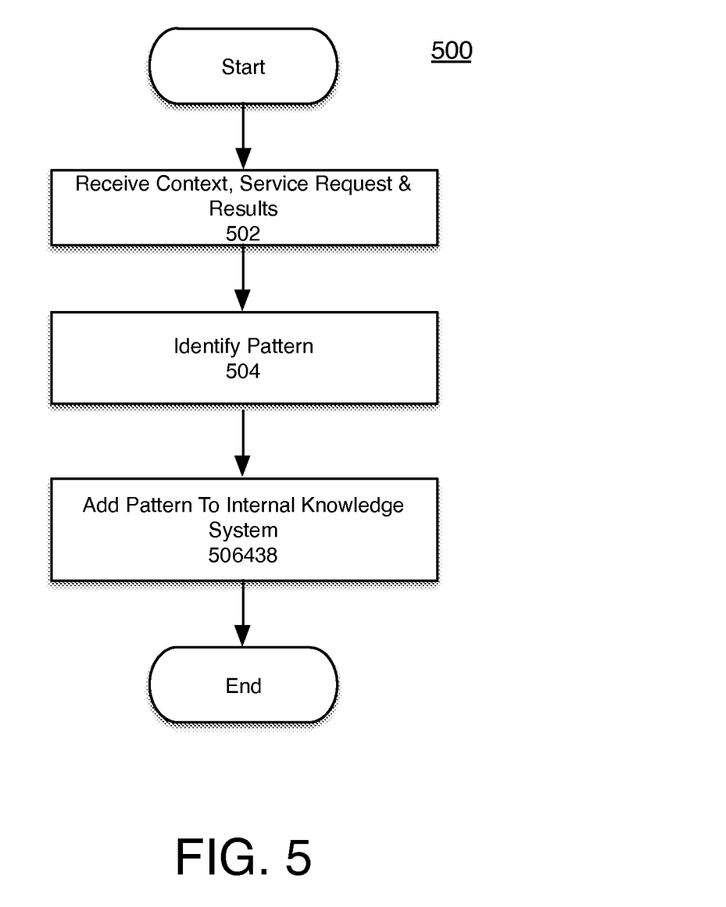
FIG. 5 is a flowchart illustrating an example of a process for building an internal knowledge system in accordance with some embodiments of the invention.

FIG. 5 is a flowchart illustrating a further process 500 for building an internal knowledge system by identifying patterns and inferring that encountering a repeat of the identified pattern that the SAMS 100 may be handle the situation similarly in accordance with some embodiments of the invention. At least one context decision may be received (502). The context, service request, any service request results (if applicable), secondary authorization determination decision, secondary authorization request results (if applicable), frequency of request, time it took to reach a decision, risk associated with the service request, and any other data relevant to the service request may be analyzed for patterns. If a pattern is identified (504), then the pattern may be added to the internal knowledge system (506). The SAMS 100 may learn service requests that should be considered for secondary authorization and/or approved for secondary authorization. For example, if a pattern is identified for a service request received from a requesting entity, in one or more contexts, for a particular resource, then the secondary authorization may be automatically approved or denied when the service request is received again within a predefined amount of time.

Figure 6:
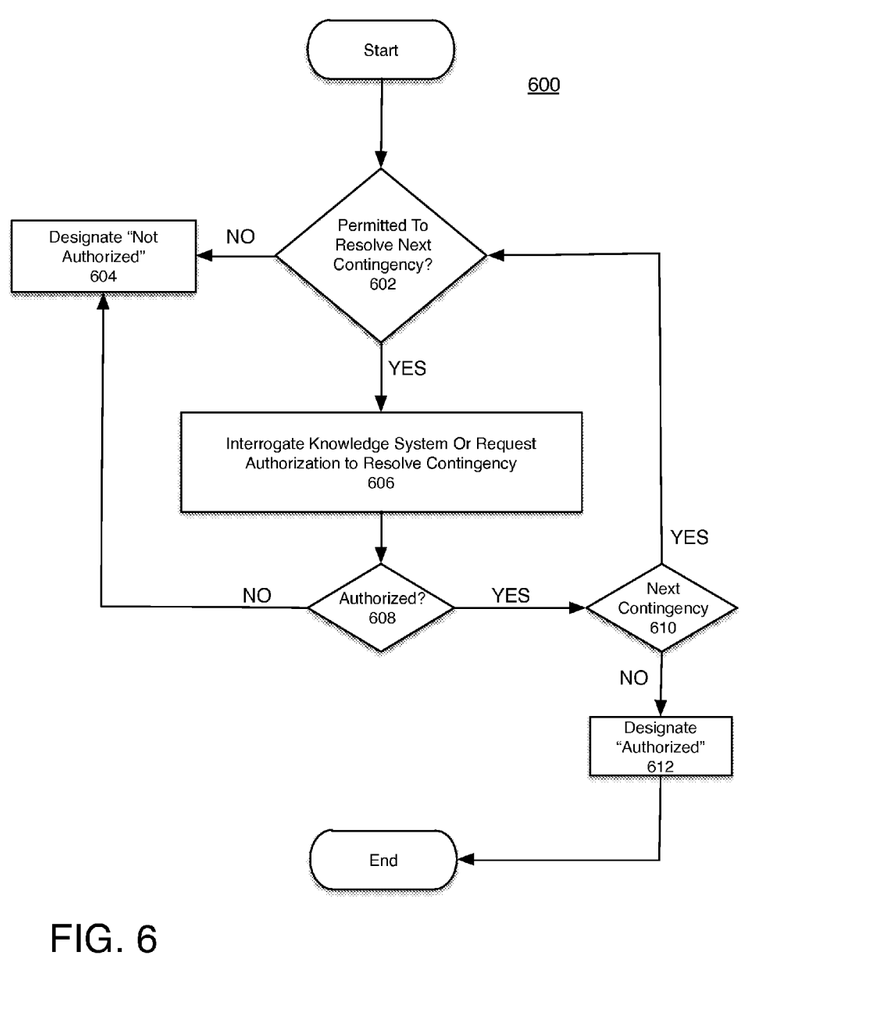
FIG. 6 is a flowchart illustrating an example of a process for resolving authorization contingencies in accordance with some embodiments of the invention.

FIG. 6 is a flowchart illustrating a process 600 for resolving authorization contingencies in accordance with some embodiments of the invention. Each contingency may be resolved when an authorization request is pending and resolution of the contingencies remains permitted (602). Resolution of contingencies may not be permitted when a predefined amount of time has expired, a contingency cannot be resolved, the service request is no longer applicable for the managed computer system, and/or any other factors. If resolution of contingencies is not permitted (602), then the secondary authorization result is designated as not authorized (604). This may result in an error message being returned in response to the original service request.

Alternatively, if the resolution of contingencies is permitted (602), then the knowledge system associated with the contingency is interrogated to resolve the contingency or a request for authorization is sent to resolve the contingency (606). The contingency may be resolved by receiving a particular context for the managed computer system from a knowledge system. For example, if the licensing server indicates a user may provision a new resource (e.g., a VM). If the contingency is not resolved (608), then the secondary authorization result is designated as not authorized (604). Alternatively, if the contingency is resolved (608), then the process continues with the next contingency (610) or the secondary authorization result is designated authorized.

The present secondary authorization management system may be utilized in a variety of different scenarios. For example, the system may be used "in line" when secondary authorization requests must be serviced instantaneously. Alternatively, or in addition, the secondary authorization management system may be used on a scheduled, or as needed (including pre-approvals), basis, in which secondary authorization request are serviced in a batch process, or in which secondary authorization requests are only required at/during certain times. For example, in some instances secondary authorization may not be needed during some periods of time but may be required during other periods of time. Or, secondary authorizations may be needed during some change window or peak business time (e.g., to ensure system changes are minimized during peak business transaction periods). In other embodiments, secondary authorizations may be required during a peak business transaction period and by default all requests for change during the this period may be denied absent such secondary authorization. When the period ends, the secondary authorization requirements may be removed, or the default deny condition may be removed. Of course, the opposite may also be true—that is, the secondary authorization management system may be configured to automatically permit all requests during a designated period of time (e.g., a scheduled update window) so that not every change request during that period has to be approved individually.

The present secondary authorization management system may be responsive to observed patterns of behavior concerning service requests. For example, thresholds may be established so that when the thresholds are met or exceeded, the secondary authorization management system responds by implementing the need for other or further authorizations, denying the requested activities by default pending further review, or other actions. For example if a particular entity is observed to make service requests of a particular kind and/or number within a specified time period and/or concerning specified events or actions, the secondary authorization management system may respond by denying further requests of the particular kind pending further review, or by notifying and/or seeking authorization for the new request from a different source than had granted the previous requests of this kind. In this way, the secondary authorization management system may respond as risk profiles change over time as a result of observed patterns of behaviors and current contexts.

Based on one or more service request authorizations, additional controls for managed computer systems may have to be put in place. For example, the managed computer systems may require post-authorization conditions in order to meet constraints necessitated by a service request authorization. In some instances these additional controls may modify the secondary authorization management system itself and thereby impact later service requests. For example, in some circumstances it may be appropriate to remove the need for secondary authorizations (at least for a certain period of time) for subsequent service requests once such an authorization has been obtained for a particular entity with respect to a current service request. Thus, the next time the same (or even a different) service request is made from the same entity (e.g., within a designated time period since a current request), the need for a secondary authorization that would ordinarily be required may be removed (e.g., if a scan of the agile information technology environment shows no vulnerabilities of a specific level).

In other instances, a post-authorization condition may provision an aspect of the managed environment. Or, a post-authorization condition may involve seeking an environment for execution of a particular service request. Post-authorization conditions could also require orchestration of the actions of the secondary authorization management system (and/or the managed computer system) with other management systems.

As should now be apparent, the need for secondary authorizations may, in some instances, be based on context, such as activities being performed by the managed computer system. Indeed, the secondary authorization system itself may be such a managed computer system and the need for use of the secondary authorization system may be triggered based on a pattern of user activities or recognized patterns of alerts within a predetermined time period. Thus, the secondary authorization management system may be configured according to defined risk profiles and associated knowledge systems may be polled or otherwise accessed to determine whether a current context exhibits risk that requires or justifies use of the secondary authorization system. Also, the secondary authorization management system may be configured to adapt its controls and policies according to a perceived risk associated with a current situation. The perceived risk (i.e., the context) may be determined based on information obtained from external knowledge systems, and one or more authorization preconditions that need to be satisfied before a secondary authorization will be provided may, accordingly, be included in an authorization process flow. In this way, the secondary authorization management system may implement controls to automatically reduce the need for secondary authorizations or preconditions therefor when the perceived risk is low and increase the need for such secondary authorizations or preconditions therefor when the perceived risk is high; the risk being assessed based on monitored activities within the managed environment.

Figure 1B:
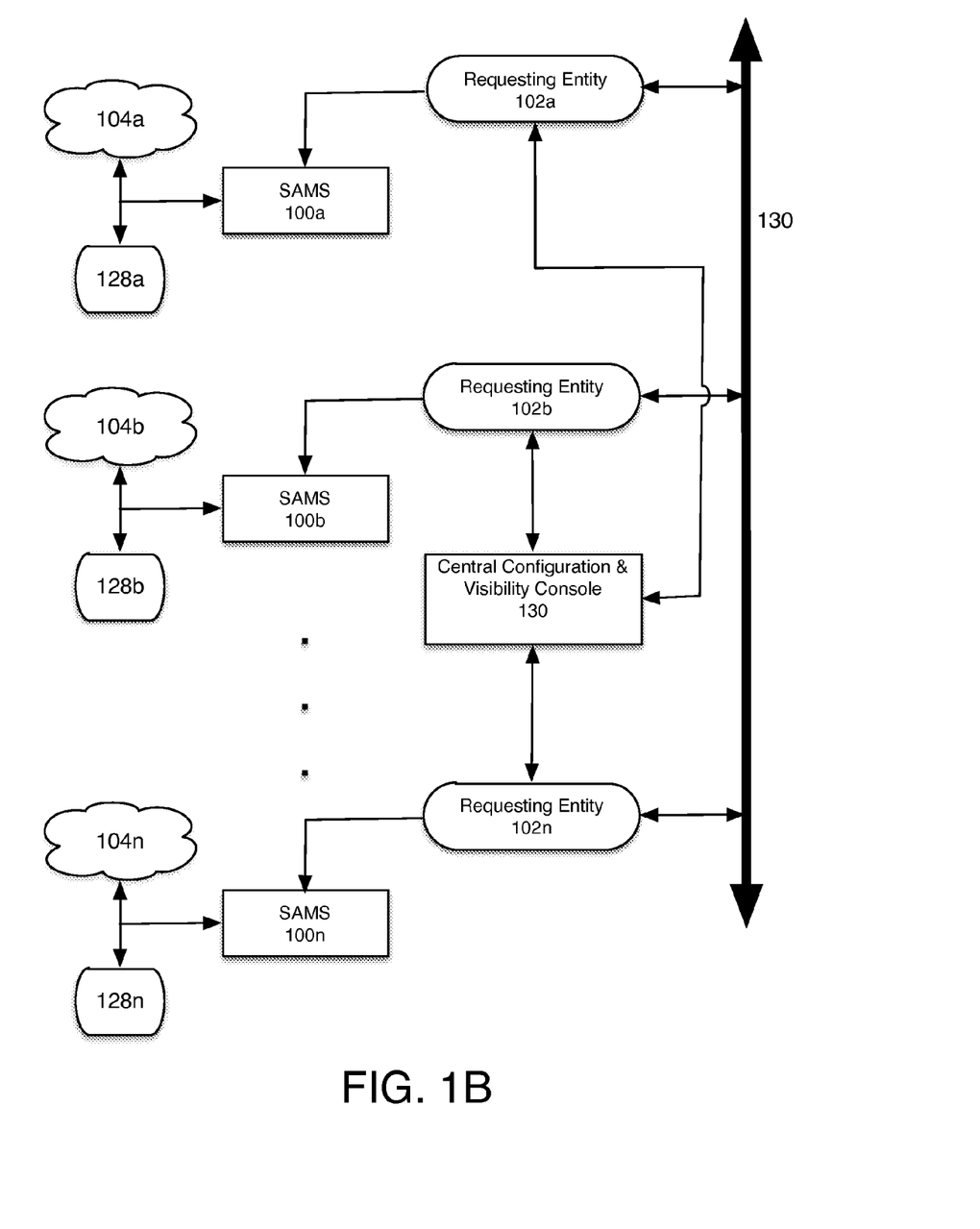
FIG. 1B depicts an example of federated secondary authorization management systems in accordance with some embodiments of the invention.

Although the foregoing discussion has assumed only a single secondary authorization management system is used, federations of such systems are also contemplated within the context of the present invention, as shown in FIG. 1B. Indeed, two or more such systems $100a$, $100b$, . . . , $100n$ may be communicatively coupled to one another over one or more computer networks 130 and may share information with one another (and with a central configuration and monitoring console 130) to provide learning across the entire federation. Thus, in some embodiments of the invention, SAMS configured to manage service requests at various enterprises may each operate within/on their own managed environments $104a$, $104b$, . . . , $104n$, and through such activities may each develop a series of their own best practices through the learned behavior and response mechanisms discussed above. Periodically, each of the individual SAMS may share their learned knowledge with other SAMS installations. Thus, over time, a set of best practice information from multiple SAMS installations may be developed and "codified", for example within a central repository. The sharing of information may be directly between SAMS installations, or between individual SAMS installations and a central SAMS. Such a system may be regarded as a centrally hosted SAMS repository in the "cloud, and such a "cloud" data center may be managed by the SAMS vendor (or other trusted party) and the information in the central repository shared across all (or all participating) SAMS users.

In addition to "best practices" a federated SAMS system of this nature may also provide for sharing of requesting entity profiles across multiple SAMS installations. Such profiles may be updated, for example, based on service request authorization outcomes. For example, allowances and/or denials of service requests made by a particular entity may be recorded by one SAMS installation and shared with other SAMS installations (e.g., other SAMS installations that operate on different sets of managed resources than the SAMS installation that recorded the service request outcomes). These authorization request outcomes may inform and/or influence (even determine) the actions of the other SAMS installations that receive the information. For example, if a particular requesting entity has a history of n service requests, of which z were denied, if z exceeds a predetermined threshold for a particular receiving SAMS installation, the receiving SAMS installation may invoke a policy that all future requests by the requesting entity are denied. Other scenarios may include modifying a path for secondary authorizations so that a different authorizing authority (than had been consulted with respect to one or more previous service requests) needs to be consulted with respect to a current service request.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 7:
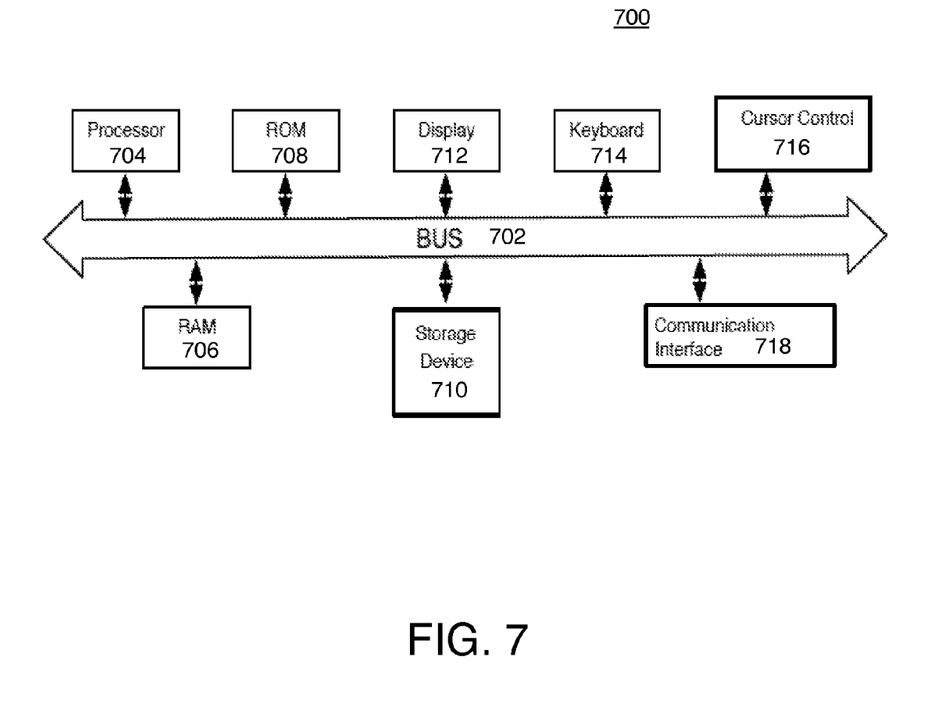
FIG. 7 depicts an exemplary computer system in accordance with some embodiments of the invention.

Further the procedures described herein may involve the use of various computer systems and computer readable storage media having computer-readable instructions stored thereon. FIG. 7 provides an example of a computer system 700 that is representative of any of the computer systems or electronic devices discussed herein. Note, not all of the various computer systems may have all of the features of computer system 700. Computer systems such as computer system 700 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 700 includes a bus 702 or other communication mechanism for communicating information, and a processor 704 coupled with the bus for processing information. Computer system 700 also includes a main memory 706, such as a random access memory (RAM) or other dynamic storage device, coupled to the bus for storing information and instructions to be executed by the processor. Main memory 706 also may be used for storing temporary variables or other intermediate information during execution of instructions to be executed by processor 704. Computer system 700 further includes a read only memory (ROM) 708 or other static storage device coupled to the bus for storing static information and instructions for the processor 704. A storage device 710, which may be one or more of a hard disk, flash memory-based storage medium, or other storage medium, is provided and coupled to the bus 702 for storing information and instructions (e.g., operating systems, applications programs and the like).

Computer system 700 may be coupled via the bus 702 to a display 712, such as a liquid crystal or light emitting diode display, for displaying information to a user. An input device 714, such as a keyboard including alphanumeric and other keys, is coupled to the bus 702 for communicating information and command selections to the processor. In some embodiments, the keyboard will be a software construct rendered via a touch screen display 712. Another type of user input device is cursor control device 716, such as a mouse, a trackball, cursor direction keys, and/or any other input device for communicating direction information and command selections to processor 704 and for controlling cursor movement on the display. Where a touch screen display is used, cursor control functions may be implemented using fingerbased gestures directly on the display. Other user interface devices, such as microphones, speakers, etc. are not shown in detail but may be involved with the receipt of user input and/or presentation of output.

The processes referred to herein may be implemented using a processor 704 executing appropriate sequences of computer-readable instructions contained in main memory 706. Such instructions may be read into main memory from another computer-readable medium, such as storage device 710, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 704 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 700 or similar electronic computing device, that manipulates and transforms data represented as physical (electronic) quantities within its registers and memories into other data similarly represented as physical quantities within its memories or registers or other such information storage, transmission or display devices.

Computer system 700 also includes a communication interface 718 coupled to the bus 702. Communication interface 718 provides a two-way data communication channel with a computer network, such as a network, which provides connectivity to and among the various servers discussed above. For example, communication interface 718 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 700 can send and receive messages and data through the communication interface and in that way communication with hosts accessible via the Internet. Computer system 700 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 700, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention. For example in some instances the need for secondary authorizations may be based on context, such as activities being performed by the managed computer system. Indeed, the secondary authorization system itself may be such a managed computer system and the need for use of the secondary authorization system may be triggered based on a pattern of user activities or recognized patterns of alerts within a predetermined time period. Thus, the secondary authorization management system may be configured according to defined risk profiles and associated knowledge systems may be polled or otherwise accessed to determine whether a current context exhibits risk that requires or justifies use of the secondary authorization system. Also, the secondary authorization management system may be configured to adapt its controls and policies according to a perceived risk associated with a current situation. The perceived risk (i.e., the context) may be determined based on information obtained from external knowledge systems, and one or more authorization preconditions that need to be satisfied before a secondary authorization will be provided may, accordingly, be included in an authorization process flow. In this way, the secondary authorization management system may implement controls to automatically reduce the need for secondary authorizations or preconditions therefor when the perceived risk is low and increase the need for such secondary authorizations or preconditions therefor when the perceived risk is high; the risk being assessed based on monitored activities within the managed environment.

What is claimed is:

1. An automated method for seeking and obtaining service request authorizations, comprising:
   receiving, from a requesting entity and at a service request authorization management system that is communicably coupled to one or more elements of a managed computer system, a service request for a resource of the managed computer system, said service request having been granted a primary authorization indicating at least that the requesting entity is authorized for the service request;
   determining whether or not secondary authorization is necessary for the received service request; and if no secondary authorization is necessary for the received service request, deeming the received service request authorized, otherwise, if secondary authorization is necessary for the received service request, then:
   determining whether, prior to seeking secondary authorization, any additional pre-authorization conditions require completion;
   if no additional pre-authorization conditions require completion, requesting secondary authorization for the received service request according to configured policies for and a current context of the managed computer system, otherwise, if additional pre-authorization conditions do require completion, postponing requesting secondary authorization for the received service request pending resolution of the additional pre-authorization conditions requiring completion and periodically determining whether or not the additional pre-authorization conditions have been completed such that if the additional pre-authorization conditions are not completed at least within a time limit, denying the service request, otherwise, if the additional pre-authorization conditions are completed at least within the time limit requesting the secondary authorization for the received service request according to then-configured policies for and a then-current context of the managed computer system;

if the requested secondary authorization is received, deeming the received service request authorized, pending resolution of any post-secondary authorization conditions, otherwise, if the requested secondary authorization is not received, denying the service request;

if the received service request is deemed authorized, determining whether or not any post-authorization conditions must be satisfied before a service request authorization can be returned in response to the received service request, and, if so, postponing providing the service request authorization pending resolution of the post-authorization conditions requiring completion, otherwise, issuing the secondary authorization for the received service request.

2. The method of claim 1, wherein determining whether or not the requesting entity is authorized for the service request comprises retrieving an authorization profile for the received service request from a database based upon attributes of the service request, the authorization profile being evaluated as part of the determination as to whether or not the requesting entity is authorized for the service request.

3. The method of claim 2, wherein attributes of the service request include one or more of: a type of operation specified in the service request, resources associated with the service request, the requesting entity, the time of request, and the managed computer system.

4. The method of claim 2, wherein the authorization profile designates at least one knowledge system with at least one context that is a factor for servicing the service request by the managed computer system.

5. The method of claim 4, wherein the context comprises one or more of: data on an environment of operation and/or execution of the managed computer system, a situation, and an external consideration for the managed computer system.

6. The method of claim 1, wherein determining whether secondary authorization for the service request is required or desired is based on at least one context of the managed computer system.

7. The method of claim 1, wherein determining whether secondary authorization for the service request is required or desired depends on one or more of: attributes of the service request, a resource specified in the service request, the requesting entity, the time of request, and a type of operation specified by the service request.

8. The method of claim 1, wherein determining whether or not any post-authorization conditions must be satisfied before the service authorization can be returned in response to the service request comprises one or more activities requiring human input.

9. The method of claim 1, further comprising, after resolving the service request, determining whether current conditions for approval of the service request remain appropriate and, if not, modifying approval criteria for future instances of the service request.

10. The method of claim 1, wherein the pre-authorization conditions and/or post-authorization conditions for the received service request comprise conditions on execution of operations specified by the service request.

11. The method of claim 1, wherein the pre-authorization conditions and/or post-authorization conditions for the received service request comprise one or more of provisioning of equipment or capacities of such equipment, and authorization of other service requests.

12. The method of claim 1, wherein the pre-authorization conditions comprise one or more of: an occurrence of a trigger event, elapsing of a specified time; tasks related to the managed computer system, tasks related to human operators or users of the managed environment, receipt of information which cannot be automatically obtained by the service request authorization management system.

\* \* \* \* \*